United States Patent [19]

Heinle

[11] Patent Number: 4,777,423
[45] Date of Patent: Oct. 11, 1988

[54] METHOD FOR REDUCING THE INSTANTANEOUS RIPPLE VOLTAGE OF AN ELECTRICAL DRIVE FED BY A CURRENT INTERMEDIATE-CIRCUIT FREQUENCY CONVERTER WITH PHASE SEQUENCE QUENCHING

[75] Inventor: Georg Heinle, Erlangen, Fed. Rep. of Germany

[73] Assignee: Siemens Aktiengesellschaft, Munich, Fed. Rep. of Germany

[21] Appl. No.: 102,547

[22] Filed: Sep. 29, 1987

[30] Foreign Application Priority Data

Oct. 6, 1986 [DE] Fed. Rep. of Germany ....... 3634035

[51] Int. Cl.$^4$ ............................................. H02P 5/40
[52] U.S. Cl. ..................................... 318/809; 318/800
[58] Field of Search ................. 363/138; 318/800, 803, 318/805, 806, 798, 807–811

[56] References Cited

U.S. PATENT DOCUMENTS 3,824,437  7/1974  Blaschke ............................... 318/803
4,028,600  6/1977  Blaschke et al. ..................... 318/810
4,707,777  11/1987  Cho ...................................... 363/138

Primary Examiner—David Smith, Jr.
Attorney, Agent, or Firm—Kenyon & Kenyon

[57] ABSTRACT

A method for reducing the instantaneous voltage ripple of an electrical drive which is fed by a current intermediary circuit frequency converter with phase sequence quenching. During pulsed operation of asynchronous rotating machinery, driven by a current intermediary circuit frequency converter with phase sequence quenching, an interfering instantaneous voltage ripple occurs due to the inverter minimum time required for the completion of a complete commutation. The operating capacity of the inverter is not imparied, even if the switch-on time of individual thyristors falls below the minimum time. Depending on the degree of incomplete commutation occurring in the process, a difference is made beween one of a "first kind" and one of the "second kind" and, in the case of the second kind, the duration of the actual switch-on pulses for maintaining a linear relationship between the current time area and the nominal pulse duration is advantageously adapted through a correction function.

8 Claims, 4 Drawing Sheets

METHOD FOR REDUCING THE INSTANTANEOUS RIPPLE VOLTAGE OF AN ELECTRICAL DRIVE FED BY A CURRENT INTERMEDIATE-CIRCUIT FREQUENCY CONVERTER WITH PHASE SEQUENCE QUENCHING

BACKGROUND OF THE INVENTION

The invention relates to a method for generating more uniform rotation with respect to mean time of an effective space vector of the stator current of asynchronous rotating machinery. The machinery is operated by a d.c. current intermediate circuit-fed inverter with phase sequence quenching. The ignition of each inverter is controlled by a thyristor. The space vector rotates cyclically in the direction of rotation of the machinery-dependent commutation sequence of six equidistant natural space vectors. At low machine speed, a pulse-like commutation between two adjacent natural space vectors occurs.

The inverter part of a current intermediary circuit frequency converter that has phase sequence quenching that feeds the stator phases of asynchronous rotating machinery is shown in FIG. 1. The frequency converter is fed from a d.c. current intermediary circuit with an intermediary circuit current $i_d$ from choke $L_d$. Each phase of the asynchronous machinery is connected to the center of an inverter branch the upper and lower half of which each consist of one thyristor and a series diode. Thus, the phase R, for example, is connected to the center of the two series circuits formed by thyristor T1 and diode D1 and diode D4 and thyristor T4, respectively. All thyristors in the upper and lower inverter halfs, e.g. the thyristors T1, T3, T5 and T4, T6, T2, respectively, are cumulatively connected via commutation capacitors C1, C3, C5, and C2, C4, C6, respectively. The current conducting time of each thyristor in this self-commutated converter can be set in a given manner by igniting another thyristor of the same inverter half at the appropriate time. The thyristor conducting current is simultaneously and abruptly cut off due to the charge of the commutation capacitor between the two thyristors.

To maintain the intermediate circuit current $I_d$ free of interruptions, one thyristor in either the upper inverter half or one in the lower inverter half is always switched on. Further, the thyristors corresponding to a commutation series cyclically alternate and take turns in the upper inverter half and lower inverter half in conducting the intermediate circuit current depending on the direction of rotation of the machine. The output of the inverter thus approximates a three-phase system that generates a settled frequency. The currents generated in the stator phases of connected asynchronous rotating machinery are represented by a "complex space vector" as is customary for the description of processes in electrical machinery. This complex space vector produces a vector diagram corresponding to FIG. 2. The space vector Z of the stator current rotates around the complex plane depending on the direction of commutation. The vector can assume one of six equidistant fixed positions, called natural space vectors, the points of which form an regular hexagon. These are designated in FIG. 2 as I to VI. The indications 1, 2 to 6, 1 correspond to the associated inverter thyristors. If, for example, the thyristor pair T4, T5 conduct current, the natural space vector assumes position IV. If the thyristor T4 is made nonconductive through ignition of thyristor T6, the space vector Z jumps to position V.

A more "uniform rotation" of the space vector of the stator current in the complex plane produces a better harmonic oscillation of the torsional moment generated by the asynchronous rotating machinery. The ideal case occurs when the asynchronous rotating machinery is operated on a symmetrical network with sineusoidal currents. The space vector then revolves continuously on a circular path and assumes all possible positions between the natural space vectors. Feeding asynchronous machinery at medium or high speed via an inverter according to FIG. 1 produces a good approximation to the ideal case. In particular, the presence of a sufficient centrifugal moment of the machinery causes the discrete "rotation" of the current vector among the six possible positions of the natural space vector to become indiscernable. The concentric running quality of the machinery is normally sufficient.

However, a low, near zero speed of rotation requires additional measures to improve the concentric running properties. The operation is normally changed to "pulsed operation" in which the space vector is switched back and forth with a pulse duty factor that is supplied through a modulation process. The pulse operation produces a space vector that is angle-dependent and lies between two of the natural space vectors. The "effective" current space vector resulting from this "mixture" can thus theoretically assume any possible intermediate position between the natural space vectors so as to rotate "quasi continuously" in mean time. An example of this method is disclosed in the German patent document No. 2,236,763.

Nevertheless, pulsed operation causes an interfering instantaneous voltage ripple to occur, especially at low machine speed. Its cause can be found in that the effective space vector of the stator current jumps across "forbidden angle zones" around the natural space vector positions. In FIG. 2, these forbidden angle zones have a magnitude of 2 $\Delta\phi$ and are indicated by a dash-dot line. For example, upon reaching boundary A of the forbidden angle zone around position II, space vector Z must jump the natural space vector to boundary B before it can again travel quasi continously through the succeeding angle region C to the next forbidden angle region around the natural space vector III. The width of the forbidden angle zones is determined by the so-called inverter minimum time which indicates the least permissable time distance between two commutations in the inverter. The commutation capacitors reverse their charge after ignition of an inverter thyristor.

The processes occurring during a commutation in a self-commutated inverter with phase sequence quenching is explained in detail, for example, in the ETZ-A, Volume 96 (1975), No. 11, pages 520–523. The commutation process is completed only after the particular commutation capacitors have reached their full charge state with reversed signs, e.g., all charge-up processes have been completed. The next ignition of a thyristor must be delayed at least by this length of time. If, for example, according to the representation in FIG. 2, the effective space vector Z, generated through pulsed commutation between the inverter thyristors T1 and T3, is intended to travel toward the natural space vector in position II, the setting ratio of the two thyristors is displaced in favor of thyristor T3. Accordingly, the duration of the setting pulse for thyristor T1 becomes increasingly shorter. These fall below the inverter minimum time the space vector Z after briefly lingering in position A jumps to position II. To continue the travel of the current vector Z with thyristor T3 switched on, thyristors T2 and T4 alternate pulse-like between themselves as current conductors. The space vector Z, after lingering briefly, jumps initially into position B. Only then do the switching pulses for the thyristor T4, which do not fall below the inverter minimum time, occur. The on-ratio of the two thyristors taking part in a given "mixture" for generating the effective space vector Z in an intermediate position with respect to the natural space vectors is limited by the inverter minimum time.

Increasing the frequency of the pulsed commutation called pulse frequency, makes the rotation of the effective space vector in the intermediate position more uniform. However, it also enlarges the forbidden angle regions. With greater pulse frequencies the switching pulses per pulse period are more finely graded, but early switching pulses occur when the effective space vector approaches the natural space vector. The switching thus falls below the minimum time and must be suppressed.

In order to decrease the width of the forbidden angle zones, European patent application No. 86/108,484.6 suggests an "angle-sensitive pulse frequency modulation". A large value is selected for the pulse frequency if the effective space vector is approximately in the middle of the permissable angle region between two natural space vectors. If, however, the effective space vector is in the vicinity on the positions of a natural space vector, the pulse frequency is lowered. The widths of the forbidden angle regions are thus reduced markedly. In this last procedure, the width of the forbidden angle zones is predetermined by the minimum time of the inverter even if, through the pulse frequency decrease in the marginal regions, the occurrence of switching pulses falling below the minimum time can be compressed to a region closer to the natural space vectors.

SUMMARY OF THE INVENTION

It is therefore an object of the present invention to reduce the switching ratios of the two thyristors participating in pulsed operation needed to maintain the minimum time of the inverter. The instantaneous ripple is thus reduced in asynchronous rotating machinery driven by a current intermediary circuit - frequency converter having phase sequence quenching. In particular, the method of the present invention uses no intervention. The apparatus for implementing the process therefore should not require an inverter. Further the method of the present invention should work with known methods for improving the rotation quality. This statement is particularly applicable to the "angle-dependent pulse frequency modulation" mentioned above.

In accordance with the present invention this is accomplished in that a switching pulse occurring during pulselike commutation for one of the two inverter thyristors which pulse is shorter than the minimum length of time required for the completion of a complete inverter commutation and longer than the inverter hold-off time is not suppressed and after its completion, the next commutation is nevertheless initiated.

DETAILED DESCRIPTION

Figure 1:
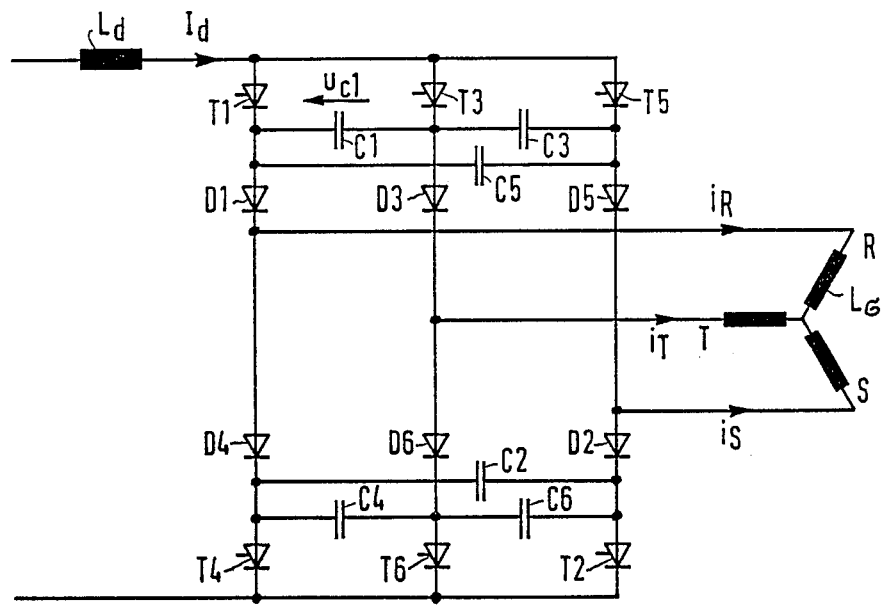
FIG. 1 shows the inverter part of a current intermediate circuit-frequency converter with phase sequence quenching.
Figure 2:
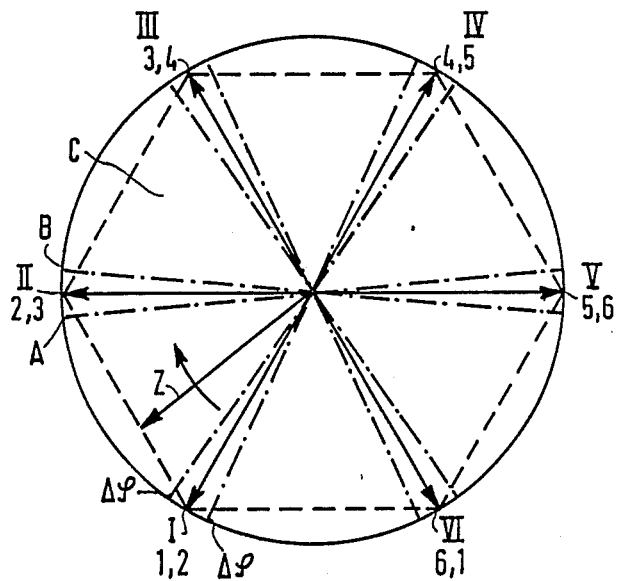
FIG. 2 shows the complex space vector of the stator current, with the positions of the natural space vector and the forbidden angle regions.
Figure 3:
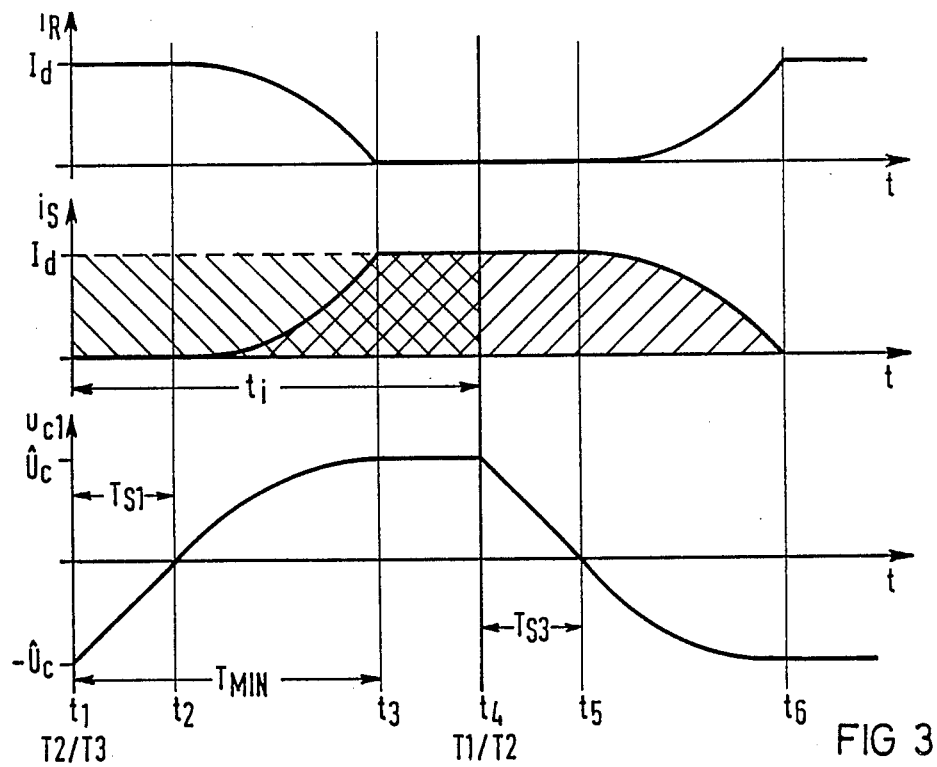
FIG. 3 shows the profile of two phase currents and one commutation capacitor voltage in the course of a "complete commutation"
Figure 3:
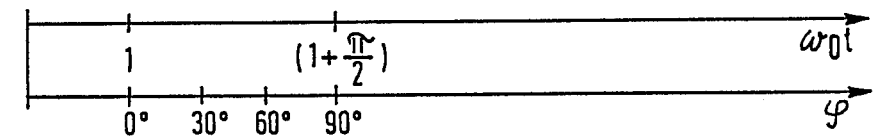

The course of a complete commutation can be subdivided into two main section as discussed in ETZ-A, Volume 96 (1975), No. 11, pages 520–523, already mentioned above. Referring to FIG. 3, this will be discussed briefly using one commutation each of thyristor T1 to T3 and T3 to T1 as examples.

Immediately after ignition of thyristor T3 at time $t_1$ thyristor T1, until now current conducting, is abruptly blocked due to the negative capacitor voltage $u_{C1}$ applied at its anode-cathode-section. The intermediate circuit current $I_d$ now flows via thyristor T3 and the diode D1 into the machinery phase winding R until the voltage at capacitor C1, which is charge-reversed at constant speed, intersects line zero at time $t_2$. At this point the "first commutation section" is completed, which is characterized by unchanged phase currents $i_R$, $i_S$ and a constant charge reversal of the participating commutation capacitor C1. The length of time $T_{12} = t_2 - t_1$ is also called inverter hold-off time $T_{S3}$ and is a function of the value $$|-\hat{U}_c|$$

of the capacitor voltage C1 at the instant of the ignition $t_1$. With the machine inductivity L δ and the two relationships $$U_{c1} = I_d \cdot \sqrt{\frac{2 L \delta}{C^*}} \text{ and } C^* = \frac{3}{2} C$$

With C1= ... =C6=C for the maximum value $$\hat{U}_{c1}$$

of the capacitor voltage $u_{c1}$ and the equivalent capacitor $C^*$ for the three commutation capacitors of an inverter half. It follows that the inverter hold-off time is given by $$T_{12} = \frac{C^*}{I_d} \cdot \hat{U}_{c1} = \sqrt{2 L \delta \cdot C^*}$$

The inverter hold-off time must always be greater than the thyristor circuit commutated turn-off time. Otherwise, a positive voltage is applied prematurely at the anode-cathode-section of the just blocked thyristor T1 and it would flip back into the conductive state.

In the "second commutation section" the actual phase current commutation takes place in the above example from $i_R$ to $i_S$. This length of time $T_{23} = t_3 - t_2$ corresponds to the fourth part of an oscillation period in the "commutation oscillating circuit", which consists of commutation capacitors $C_k$ with $k=1,3, 5$ or $2, 4, 6$ of the given inverter half and two leakage inductances $L \, \delta$. With the circuit frequency $$\omega_0 = \sqrt{2 L \cdot C^*}$$

of this oscillation it follows:

$$T_{23} = \frac{\pi}{2\omega_0}.$$

At time $t_3$ the commutation of the intermediate circuit current $I_d$ is to the branch with thyristor T3 and the series diode D3, to which phase winding S of the asynchronous rotating machinery is connected, is completely ended. Current $i_S$ has charged to the full value of the intermediary circuit current $I_d$. Intermediary circuit capacitor voltage $u_{C1}$ has charged to the full maximum voltage value $\hat{U}_c$, now positive. The same is true of times $T_{12}$ and $T_{23}$ for the first and second commutation sections which correspond to the "inverter minimum time". This state must be maintained at least before another thyristor of the same inverter half, for example T1 at time $t_4$, may be ignited. It holds that $$T_{MIN} = T_{12} + T_{23} = \frac{1}{\omega_0}\left(1 + \frac{\pi}{2}\right)$$

The switching pulses, the length of time of which would fall below the minimum time, especially during the already described pulse operation, are suppressed in inverter control processes that are known in the art.

It is a particular feature of the present invention that the minimum time of the inverter can be slightly less without impairing the principle of the operating function of an inverter with phase sequence quenching. Rather, a partially completed commutation can be broken off prematurely by igniting another thyristor to initiate a further commutation prior to completion of the inverter minimum time. This commutation is termed "incomplete commutation" and designates a process which is elucidated below in conjunction with FIGS. 4, 5 and 6. A distinction must be made between an incomplete commutation "of first kind" and "second kind" depending on the degree of incompletion.

Figure 4:
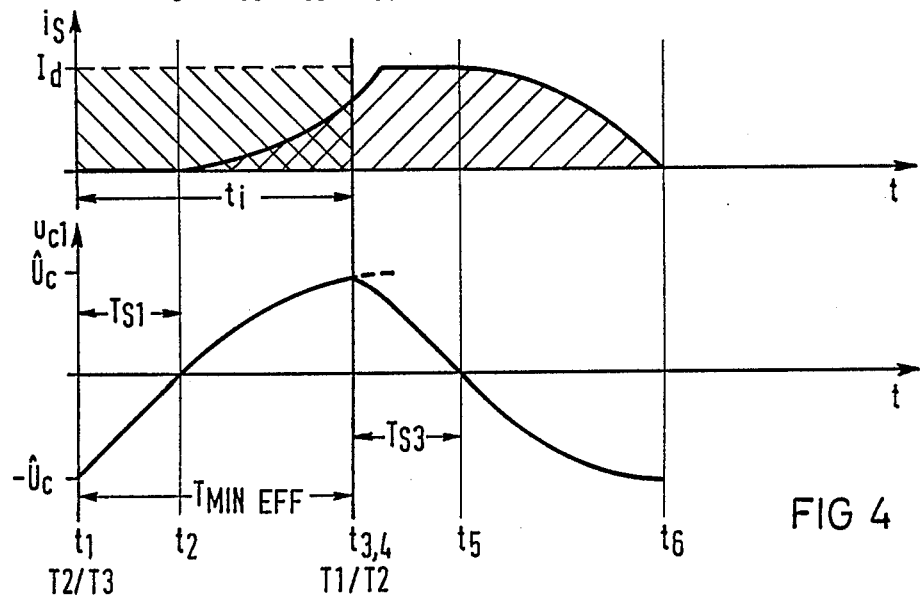
FIG. 4 shows the course of a phase current and one commutation capacitor voltage during an "incomplete commutation of the first kind"

Thus, the current conducting time according to the invention, such as by thyristor T3 as shown in FIG. 4, can be prematurely ended by igniting thyristor T1 at time $T_{3,4}$. The commutation capacitor C1 is now no longer fully charged to the maximum value $\hat{U}_c$ corresponding to the stationary starting state at time $t_1$. The actual minimum time $T_{MIN \, EFF}$ now corresponds exactly to the on-time $t_i$ and is shorter than the inverter minimum time $T_{MIN}$ in complete commutation. The capacitor voltage remains positive during the first commutation section of an ignition of thyristor T1 that follows immediately at a time $t_{3,4}$. The phase current $i_s$ nevertheless reaches the maximum value $I_d$. The process of commutation is not completely concluded within the length of time of the incomplete commutation of the intermediary circuit current $I_d$ to phase winding S. Part of the commutation process is displaced into the next commutation process and completed there. An overlapping of the commutation processes takes place. The current interruption ability in the branches of the inverter is not impaired by the commutation capacitors, so long as at least the hold-off time $T_S$ of the thyristor exposed to incomplete commutation is respected. In FIG. 4, the hold-off time is exemplified b $T_{S1}$ of thyristor T1. This thyristor may not also be "switched off" so prematurely that the ignition time $t_{3,4}$ coincides with time $t_2$ or even falls below it.

Lastly, what is significant for inverter driven asynchronous rotating machinery is not the form of the stator phase winding currents but rather the current time area generated during its existence. It is therefore advantageous to maintain the linear relationship $FI = I_d \cdot t_i$ which holds in the complete commutation between the current time area FI and the on-time $t_i$ of the given inverter thyristor. The intermediary circuit current $I_d$ serves as a proportionality constant in the event of the incomplete commutation according to the invention.

FIG. 3 shows the phase current $i_S$ in complete commutation. The theoretical current time area FI is shown as rectangle with sides $I_d$ and $t_i$. The current time area actually occurring in phase S in the actual course of the phase current $i_S$ is shown as a hatched area in FIG. 3 with the lines proceeding from lower left to upper right. This area is identical to FI. By shortening or lengthening the on-time $t_i$ the value of the two areas changes with the proportionality constant $I_d$.

These relationships also remain valid and unchanged in the incomplete commutation according to the invention as shown in FIG. 4. In it, for example, approximately 12 electrical degrees of angle before completion of the complete commutation at 90 electrical degrees of angle, the commutation of the intermediary circuit current $I_d$ on phase S at time $t_{3,4}$ is initiated prematurely. On both FIGS. 3 and 4 the time and angle axis include the $\omega_0$ reference scale. Time progression begins at time $t_1$ and angle progression at time $t_2$. The unchanged linear controllability of the current time area, even for an incomplete commutation of this order of magnitude, becomes evident in a comparison of the areas of the theoretical and the actual current time area. There are thus no disadvantages discernible as compared to the completed commutation. As can be further seen from the progression of the capacitor voltage $u_{C1}$, the commutation following the incomplete commutation at time $t_{3,4}$ causes an even greater hold-off time $T_{S3}$. Thyristor T3 is replaced as current conductor because the delay increases from $i_S$ to $I_d$. This is especially true with a current time area decreasing superproportionally with the time of the switching pulses. It is therefore advantageous to measure the current so as to linearize the ratio of current time area to switch-on time. The on-times $t_i^*$ given by the modulation no longer effect the particular thyristors but are advantageously changed slightly so that the desired proportionality is maintained.

It can be shown that the ratio of current time area to on-time does not correspond to the value $I_d$ if the on-time $t_i$ ends more than 30 electrical degrees of angle before completion of the complete commutation at 90° at time $t_3$ as shown in FIG. 3. The on-times $t_i$ in the range $$\frac{1}{\omega_0} + \frac{1}{6}\left(\frac{2\pi}{\omega_0}\right) < t_i < \frac{1}{\omega_0} + \frac{1}{4}\cdot\frac{2\pi}{\omega_0}$$

are considered incomplete commutations of "first kind" and on-times in the range $$\frac{1}{\omega_0} < t_i < \frac{1}{\omega_0} + \frac{1}{6}\left(\frac{2\pi}{\omega_0}\right)$$

as commutations of the "second kind". No changes compared to the completed commutation are required in the first kind. It is advantageous to classify the second kind as either nominal on-times $t_i^*$ of the type required by the modulation due to the pulse duty factor, or as on-times $t_i$ where the switching pulses are effective after a correction.

Figure 5:
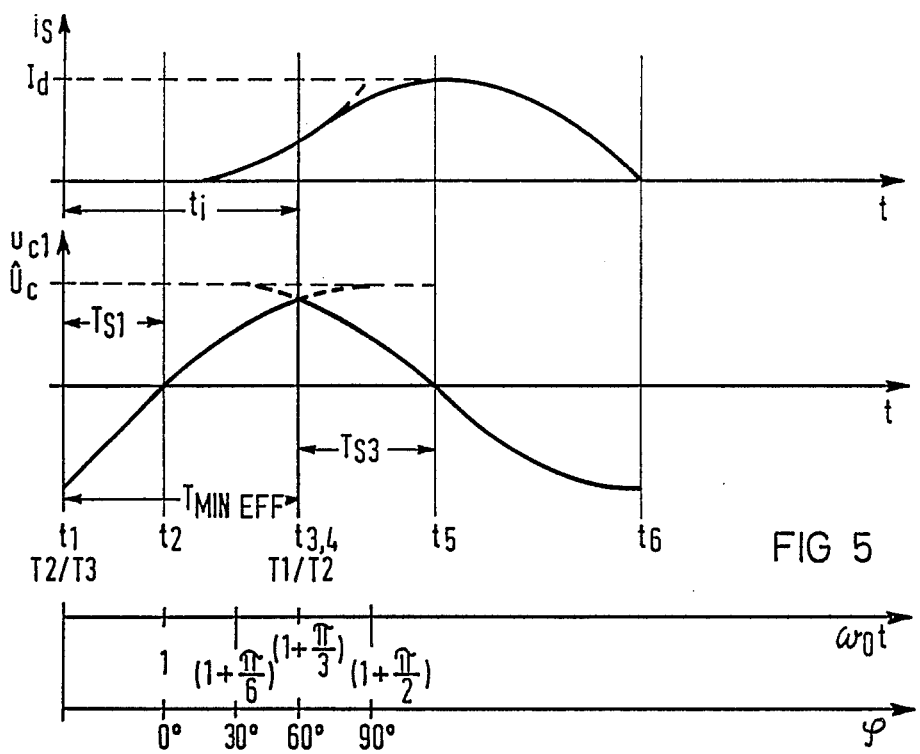
FIG. 5 shows the course of a phase current and one commutation capacitor voltage during an "incomplete commutation of the second kind"
Figure 6:
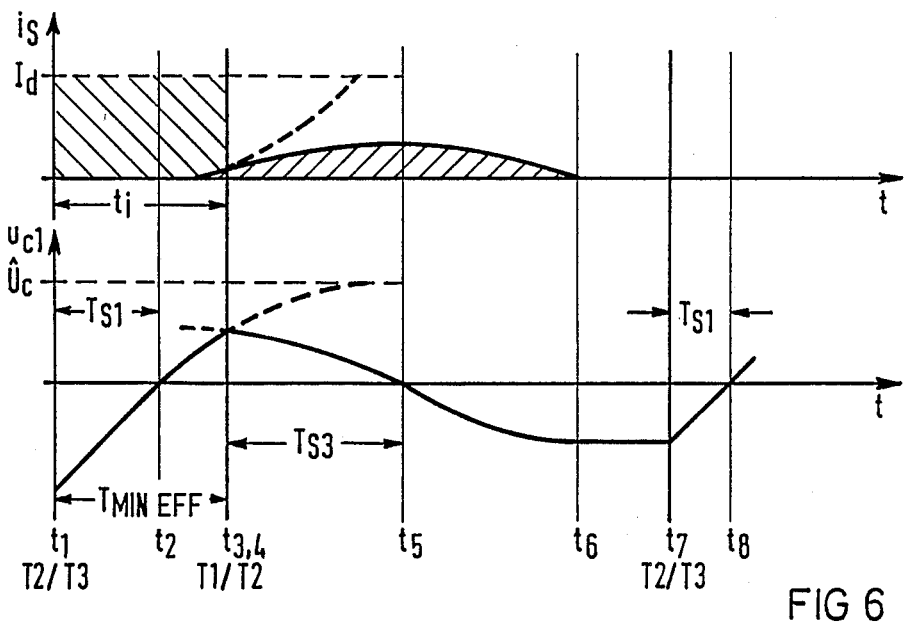
FIG. 6 shows the course of a phase current and a commutation capacitor voltage during a further "incomplete commutation of the second kind"

FIGS. 5 and 6 show the two exemplary types of incomplete commutations of the second kind with pulse lengths $t_i$ of approximately $$\frac{1}{\omega_0} + \frac{1}{6}\left(\frac{2\pi}{\omega_0}\right) \text{ and } \frac{1}{\omega_0} + \frac{1}{12}\cdot\frac{2\pi}{\omega_0}$$

The commutation shown in FIG. 5 just completes phase S at an electrical phase angle of 30° before a completed course of a commutation. The phase angle of 30° corresponds to the boundary between commutation of the first and the second kind. The on-time $t_i$ for the thyristor T3 is then large enough that the phase current $i_S$ still reaches the maximum value $I_d$ at time $t_5$ with the end of the first commutation section of the next commutation on phase R. If the very brief switching pulses of time $t_i$ given by the modulation falls below the limit value of $$\frac{1}{\omega_0}\left(1 + \frac{\pi}{3}\right),$$

then the effective current time area below the given phase current decreases superproportionally. In the example shown in FIG. 6, the theoretical nominal current time area is again shown as a hatched rectangle with sides $t_i$ and $I_d$. The actual area resulting over the course of $i_S$ is markedly smaller. This result can be approximated with the linear equation $$FI \approx I_d\frac{3+\pi}{\pi}\left(t_i - \frac{1}{\omega_0}\right).$$

Equating with the required current time area $$FI = I_d \cdot t_i^*$$

produce an advantageous correction function for the actual on-time of $$t_i = \frac{\pi}{3+\pi} t_i^* + \frac{1}{\omega_0}.$$

The maintainence of the linear controllability of the current time area also results for complete commutations of the second kind.

The theoretical on-time $t_i$ can be shortened so that it is only slightly greater than the inverter hold-off time of the thyristor just switched off. At the beginning of the switching pulse shown in FIG. 6, for example, thyristor T1 switches off at time $t_1$ so that time $t_{3,4}$ would nearly coincide with the time $t_2$. When thyristor T3 is switched off in the first section $t_{3,4}\ldots t_5$ of the next commutation, the available hold-off time $T_{S3}$ again is significantly larger than the hold-off time $$1/\omega_0$$

in complete commutations. In practice, however, it is advantageous to suppress such short on-times. As can readily be seen in the example according to FIG. 6, the commutation capacitor C1 is charged only incompletely due to the short on-time $t_1 \ldots t_{3,4}$. During the next complete commutation from time $t_{3,4}$ on, the capacitor oscillates to a reduced maximum voltage value with reversed sign. If the thyristor T3 is again switched on at time $t_7$ in the already described pulsed operation, the inverter hold-off time $t_{S1}$ is significantly shorter until the completion of the commutation section at time $t_8$. The end time $t_{3,4}$ of the switch-on pulse $t_i$ advantageously should therefore only be advanced so far that the inverter hold-off time $T'_{S1}$ at time $t_7$, occurring with the repeat switch-on of the same thyristor T1 in pulsed operation, does not fall below the structure-specific thyristor circuit-commutated turn-off time. In practice, the length of switch-on pulse $t_i$ in incomplete commutation is thus advantageously limited downward to $$t_i \approx \frac{1}{\omega_0} + \frac{1}{12}\cdot\frac{2\pi}{\omega_0}$$

and shorter switch-on times supplied by the modulation are suppressed.

Figure 7:
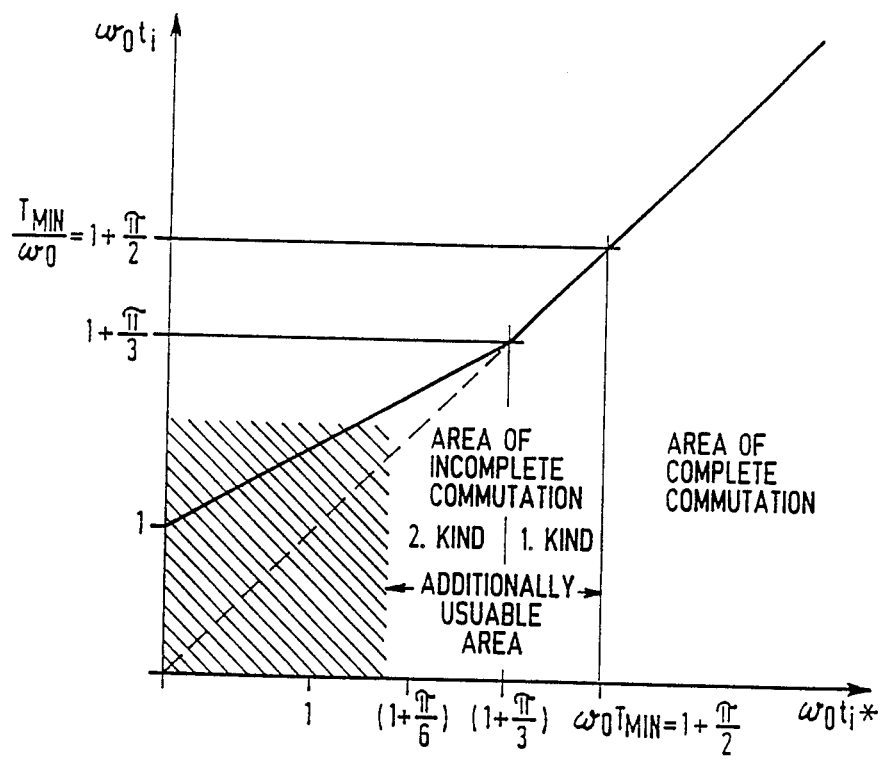
FIG. 7 shows the course of a correction function for the actual switched-on length of time.

The switch times shown in FIG. 7 are shown in the form of a correction function and scaled to the circuit frequency $\omega_0$ of the commutation oscillation circuit. In the range of the complete commutations at switch-on times of $$t_i^* = t_i \geq \left[T_{MIN} = \frac{1}{\omega_0}\left(1 + \frac{\pi}{2}\right)\right]$$

they are used as is to switch on the thyristors. Only in the transition from incomplete commutations of the first kind to such of the second kind, e.g. when the time $$t_i^* = t_i \approx \frac{1}{\omega_0}\cdot 1 + \frac{\pi}{3}$$

is not exceeded does the now deviating correction function of the linear equation according to the invention follow $$t_i = \frac{\pi}{3+\pi} t_i^* + \frac{1}{\omega_0}.$$

The area beginning at approximately $$t_i \leq \frac{1}{\omega_0}\left(1 + \frac{\pi}{6}\right)$$

which, due to the thyristor circuit commutated turn-off time to be kept, is shown shaded.

The additional usable area resulting from the incomplete commutation according to the invention compared to the previously used complete commutation is shown approximately in the form of a double arrow.

What is claimed is:

1. A method for generating a rotation as uniform as possible of an effective space vector in a temporal mean of a stator current of an asynchronous rotating machine driven by an inverter with phase sequence quenching fed by a d.c. current intermediary circuit, including inverter thyristors the ignition of which one by one in response to switch-on pulses in a machinery rotational direction-dependent commutation sequence result in cyclically rotation to one of six equidistant natural space vectors, comprising the steps of:
   igniting said transistors in sequence, one by one, when operating at medium and high speeds;
   at low machine speed carrying out additional pulse-like commutation between two adjacent natural space vectors using said switch-on pulses; and
   permitting a switch-on pulse occurring during pulse-like commutations to be shorter than a minimum time required for the completion of a complete inverter commutation but longer than an inverter hold-off time; and
   after completion of a switch-on pulse, initiating the next commutation.

2. A method as claimed in claim 1 and further comprising the step of limiting the duration of a switch-on pulse which has a duration that is less than said minimum time for one of said inverter thyristors toward a lower limit in such a way that said inverter hold-off time occurs with a repeat switch-on in pulsed operation so as not to fall below a circuit commutated turn-off time of said inverter thyristor.

3. A method a claimed in claim 2 wherein said switch-on pulse has a predetermined nominal value and further includng the step of correcting said value to obtain a corrected time determined so that a current time area generated in a corresponding motor phase winding with switch-on pulses which fall below said minimum time remains linear with respect to said nominal pulse time.

4. A method as claimed in claim 3, comprising correcting said nominal value if it falls below a value corresponding to a sum of said inverter hold-off time and a sixth part of a periodic time $$\frac{2\pi}{\omega_0}$$

of a current oscillation in a commutation oscillation circuit that is formed by commutation capacitors and leakage inductances in a given machine.

5. A method as claimed in claim 4 comprising correcting said nominal value of the duration of said switch-on pulse as a function of a circuit frequency $\omega_0$ of a current oscillation in said commutation oscillating circuit, said corrected time being approximated, with a modulation-dependent preset nominal pulse time $t_1^*$, according to the equation $$t_i = \frac{\pi}{3 + \pi} t^* + \frac{1}{\omega_0}.$$

6. A method as claimed in claim 1 wherein said switch-on pulse has a predetermined nominal value and further including the step of correcting said value to obtain a corrected time determined so that a current time area generated in a corresponding motor phase winding with switch-on pulses which fall below said minimum time remains linear with respect to said nominal pulse time.

7. A method as claimed in claim 6, comprising correcting said nominal value if it falls below a value corresponding to a sum of said inverter hold-off time and a sixth part of a periodic time $$\frac{2\pi}{\omega_0}$$

of a current oscillation in a commutation oscillation circuit that is formed by commutation capacitors and leakage inductances in a given machine.

8. A method as claimed in claim 7 comprising correcting said nominal value of the duration of said switch-on pulse as a function of a circuit frequency $\omega_0$ of a current oscillation in said commutation oscillating circuit, said corrected time being approximated, with a modulation-dependent preset nominal pulse time $t_1^*$, according to the equation $$t_i = \frac{\pi}{3 + \pi} t^* + \frac{1}{\omega_0}.$$

* * * * *